(12) United States Patent
Diab

(10) Patent No.: US 8,392,964 B2
(45) Date of Patent: Mar. 5, 2013

(54) SYSTEM AND METHOD FOR AUTHENTICATING A POWERED DEVICE ATTACHED TO A POWER SOURCING EQUIPMENT FOR POWER PROVISIONING

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 1350 days.

(21) Appl. No.: 11/744,957

(22) Filed: May 7, 2007

(65) Prior Publication Data
US 2008/0256598 A1 Oct. 16, 2008

Related U.S. Application Data

(60) Provisional application No. 60/911,123, filed on Apr. 11, 2007.

(51) Int. Cl.
*G06F 21/00* (2006.01)
(52) U.S. Cl. .............................................. 726/2; 726/36
(58) Field of Classification Search ................. 726/2, 36
See application file for complete search history.

(56) References Cited

U.S. PATENT DOCUMENTS

| | | | |
|---|---|---|---|
| 7,280,931 B1 * | 10/2007 | Kim et al. ........................ | 702/81 |
| 7,340,325 B2 * | 3/2008 | Sousa et al. .................... | 700/295 |
| 7,549,067 B2 * | 6/2009 | Tolliver .......................... | 713/320 |
| 2002/0115426 A1 * | 8/2002 | Olson et al. .................... | 455/410 |
| 2006/0143583 A1 * | 6/2006 | Diab et al. ........................ | 716/4 |
| 2006/0168459 A1 * | 7/2006 | Dwelley et al. ................ | 713/300 |
| 2008/0005433 A1 | 1/2008 | Diab et al. | |
| 2008/0005600 A1 | 1/2008 | Diab et al. | |
| 2008/0005601 A1 | 1/2008 | Diab | |
| 2008/0016263 A1 | 1/2008 | Diab et al. | |
| 2008/0184355 A1 * | 7/2008 | Walrath et al. ..................... | 726/9 |
| 2011/0072286 A1 * | 3/2011 | Graham ......................... | 713/323 |

\* cited by examiner

*Primary Examiner* — Jeffrey Pwu
*Assistant Examiner* — William Corum, Jr.
(74) *Attorney, Agent, or Firm* — Duane S. Kobayashi

(57) ABSTRACT

A system and method for authenticating a powered device attached to a power sourcing equipment for power provisioning such as power over Ethernet (PoE) enabled device communicating with a PoE enabled switch. Powered devices such as computing devices, security cameras, VoIP phones, wireless access points, or the like, can be detected by a PoE switch upon connection. Power applied to the powered device is restricted until information received from the powered device is authenticated.

11 Claims, 3 Drawing Sheets

SYSTEM AND METHOD FOR AUTHENTICATING A POWERED DEVICE ATTACHED TO A POWER SOURCING EQUIPMENT FOR POWER PROVISIONING

This application claims priority to provisional application No. 60/911,123, filed Apr. 11, 2007, which is incorporated by reference herein, in its entirety, for all purposes.

BACKGROUND

1. Field of the Invention

The present invention relates generally to Power over Ethernet (PoE) and, more particularly, to a system and method for authenticating a powered device attached to a power sourcing equipment for power provisioning such as POE enabled device communicating with a PoE enabled switch.

2. Introduction

The IEEE 802.3af and 802.3 at PoE specifications provide a framework for delivery of power from power sourcing equipment (PSE) to a powered device (PD) over Ethernet cabling. In this PoE process, a valid device detection is first performed. This detection process ensures that power is not applied to non-PoE capable devices.

PDs such as VoIP phones, wireless LAN access points, and network cameras represent a class of devices that are provisioned by the enterprise to meet particular needs as they arise. A PD such as a computing device (e.g., portable computer), on the other hand, can be attached to a PoE network entirely at the discretion of the end user. For example, a conference room can be configured to provide power to multiple portable computing devices that are controlled by various users. In these dynamic configuration environments, concerns can arise regarding the suitability or permissibility of such devices being attached to the network as well as the device's impact on limited PSE power budgets. What is needed therefore is a mechanism for managing the connection of PDs in such dynamic configuration environments.

SUMMARY

A system and/or method for authenticating a powered device attached to a power sourcing equipment for power provisioning such as POE enabled device communicating with a PoE enabled switch, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
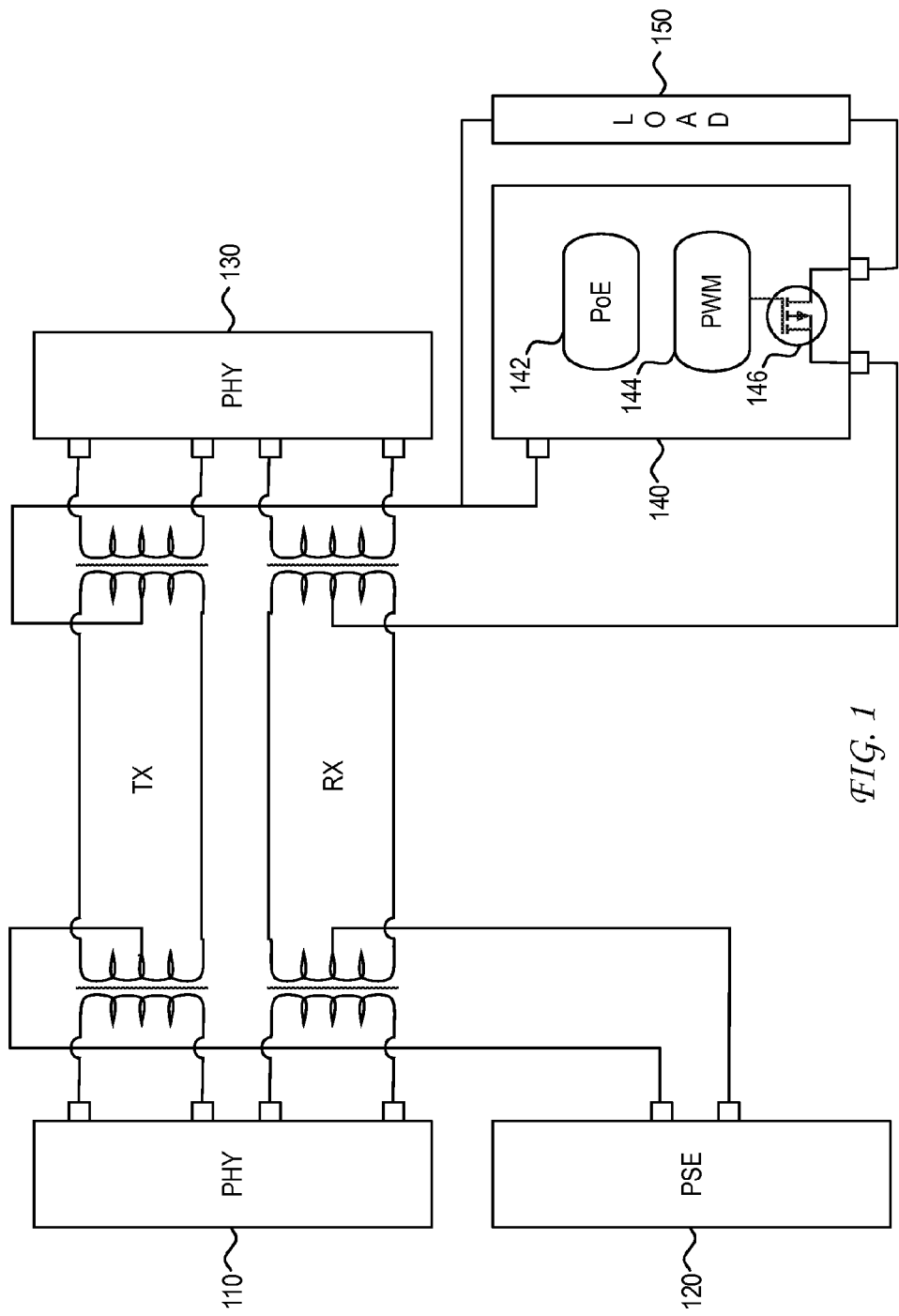
FIG. 1 illustrates an embodiment of a PoE system.

FIG. 1 illustrates an embodiment of a power over Ethernet (PoE) system. As illustrated, the PoE system includes power sourcing equipment (PSE) 120 that transmits power to powered device (PD) 140. Power delivered by the PSE to the PD is provided through the application of a voltage across the center taps of transformers that are coupled to a transmit (TX) pair and a receive (RX) pair of wires carried within an Ethernet cable. In general, the TX/RX pair can be found in, but not limited to structured cabling. The two TX and RX pairs enable data communication between Ethernet PHYs 110 and 130 in accordance with 10BASE-T, 100BASE-TX, 1000BASE-T, 10 GBASE-T and/or any other layer 2 PHY technology.

As is further illustrated in FIG. 1, PD 140 includes PoE module 142. PoE module 142 includes the electronics that would enable PD 140 to communicate with PSE 120 in accordance with a PoE standard such as IEEE 802.3af, 802.3 at, legacy PoE transmission, or any other type of PoE transmission. PD 140 also includes pulse width modulation (PWM) DC:DC controller 144 that controls power FET 146, which in turn provides constant power to load 150.

In the example of the IEEE 802.3af standard, PSE 120 can deliver up to 15.4 W of power to a plurality of PDs (only one PD is shown in FIG. 1 for simplicity). In the IEEE 802.at specification, on the other hand, a PSE can deliver up to 30 W of power to a PD over 2-pairs or 60 W of power to a PD over 4-pairs. Other proprietary solutions can potentially deliver even higher levels of power to a PD. In general, high power solutions are often limited by the limitations of the cabling.

As noted, one of the responsibilities of PSE 120 is to manage the power that is supplied to PD 140. One example of a PD is a computing device, such as a laptop computer or other portable or remotely provisioned device. Computing devices that are connected to enterprise networks are often connected on a non-permanent basis. Where the computing device is a user device such as a portable computer, then the connection of the portable computer would be at the discretion of the user. Other PDs that support the enterprise infrastructure (e.g., touch screen kiosks, presentation computers, registration computers, VoIP phones, wireless LAN access points, network cameras, etc.) can be rapidly provisioned to meet the immediate and changing needs of the enterprise.

In this provisioning environment, there can be little control over the connection of PDs to the PoE system. As noted, control over these connections can be exerted by an end user (or owner of the PD). For example, where users in a conference room may not be associated with the enterprise running the PoE system, there may be no way to know whether the device is a conforming, well-behaved PD. From the perspective of the user connecting the PD to the PoE system, the PoE connection would be viewed in the same way as a connection of a plug into an AC wall socket.

This perspective on obtaining power via a network can lead to increasing instances of incompatibility, resulting in damage to an enterprise network. Whether by an end user or by support staff in an organization, the casual indifference in connecting any type of device to the powered network can result in damage to the network.

For example, a switch that is designed as an Environment A type device only requires port-to-ground isolation, as compared to a more expensive Environment B type device that requires port-to-port isolation. When unknown and possibly non-conforming PD hardware interacts with an Environment A type device, there is the risk that a surge/transient on the network cable can cause damage to other ports in the switch. Surges/transients represent a significant risk when dealing with computing device behavior that is not well defined. PDs such as computing devices that have rapid changes due to user-controlled changes in power states (e.g., application and device loads) are susceptible to causing perturbations on the network cable. Issues of safety and other liability issues can therefore arise if non-conforming devices are not properly managed.

Thus, PDs that are not fully compliant represent a significant risk to the PoE network. The initial detection process simply determines that the PD is PoE capable. The specific form of PoE (e.g., non-standard 802.3af) to which the PD is designed is not determined during detection. Switches are generally designed to promote maximum compatibility. This increased compatibility would therefore enable various PoE devices to be connected to the switch. Beyond this point of connection, however, there is no mechanism to assure the network operator that the PD will be a well-behaved device when drawing power from the network.

In one scenario, a user can have a "compliant" PD that exhibits poor behavior. For example, the compliant device can have bad noise properties and cause fluctuations on the source. The IT department may therefore want to control the type of devices that are plugged into the network. In another example, a PD can specify that it wants 15.4 W, but draws more than the requested amount of power during operation. This type of behavior is particularly problematic when dealing with a capacity constrained PSE.

PSEs have limited power budgets and the allocation of that limited power budget is key to effective PoE operation. PDs that are not well behaved can significantly impact the PSEs ability to provide power to all legitimate PDs. This is especially true where an unauthorized PD attempts to draw power from the network. In general, if the PD is not authenticated then power should not be wasted on it. This would be true regardless of whether it would have a negative effect on the network.

Figure 2:
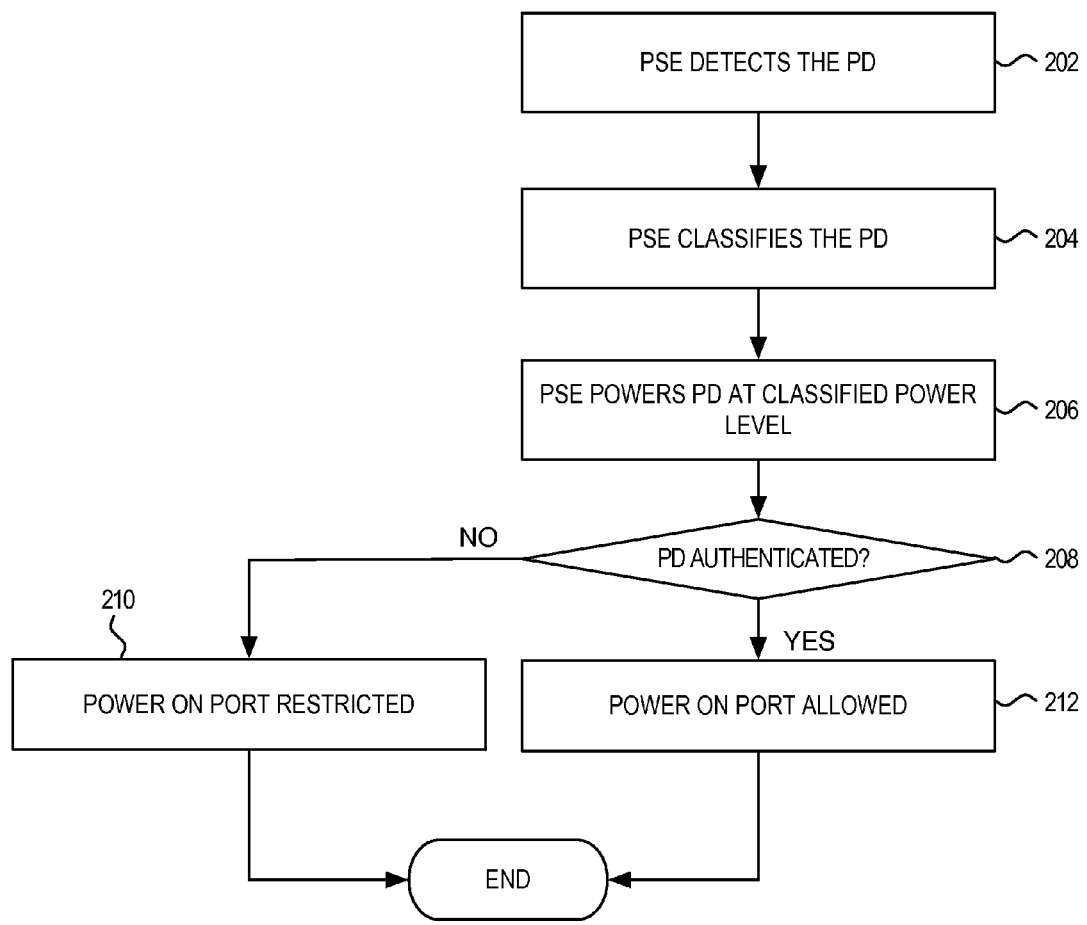
FIG. 2 illustrates a flowchart of an embodiment of authentication of a PD in a PoE system.

In accordance with the present invention, management of such potentially non-conforming or unauthorized hardware is effected through an authentication process. FIG. 2 illustrates a flowchart of an embodiment of the present invention. As illustrated, the process of the present invention begins at step 202, where a PSE detects a PD upon connection of the PD to the PSE. This could occur, for example, when a PD is plugged into the PoE network. The detection process can occur in various ways. In one example, this device detection process is enabled via Layer 1 communication, although other communication schemes such as Layer 2 communication can also be used as part of the detection process.

In a conventional 802.3af process, the PSE would power the PD at the power level identified during classification at step 204. If classification is not performed, then the PSE would power the PD at the default power level of 15.4 W at step 206. Significantly, this default power level is the highest power classification under IEEE 802.3af and represents the greatest risk when applied to potentially non-conforming PD hardware. In 802.3 at, on the other hand, if the PSE discovers a class 4 device, the PSE would initially power the PD at 15.4 W then wait for the Layer 2 classification process at step 204 to reclassify the power level. Powering at the classified power level would then occur at step 206.

In accordance with the present invention, risk to the PoE system is reduced by determining whether to restrict the power applied to a PSE port at step 206. This restriction is intended to limit the exposure of the PoE system to unnecessary risk. In other words, the PSE can be designed to provide power initially, with the continuation of such provided power being contingent on an authentication process.

As illustrated in FIG. 2, the PSE enters into a PD authentication process at step 208. As would be appreciated, the authentication process can be effected through a Layer 2 or Layer 3 protocol, the specifics of which would be implementation dependent. While the example embodiment of FIG. 2 illustrates authentication occurring after device classification, the authentication process can occur prior to or with device classification. In one embodiment, the authentication is performed in the PoE system. In another embodiment, the authentication is performed in an external authentication system.

Figure 3:
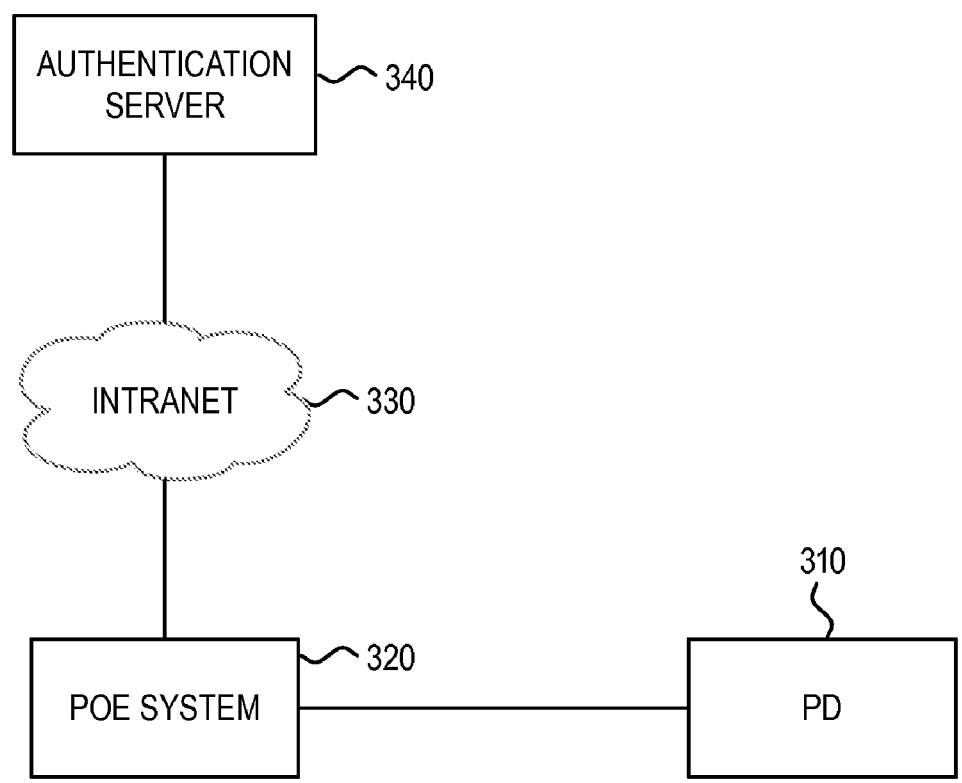
FIG. 3 illustrates an embodiment of an authentication system.

One embodiment of such an external authentication system is illustrated in FIG. 3. As illustrated, authentication server 340 is linked to PoE system 320 via intranet 330. Here, PoE system 320 can include the PHY, switch, PSE, and the associated processing components. Authentication information received from PD 310 can then be passed to PoE system 320, which forwards such authentication information to authentication server 340. After processing the authentication information, authentication server 340 can then return an approved/denied message to PoE system 320.

The authentication process at step 208 can implement any of a variety of authentication schemes that use one or more unique identifying parameters that can authenticate the user or equipment to be used. In one embodiment, the authentication process can be directed to some form of device authentication. For example, the authentication process could be designed to determine whether the MAC address of the PD is registered with the PoE system or an authentication server. In one embodiment, the PSE switch can periodically download a copy of or subset of the authentication database and store it locally. In another embodiment, the PSE switch can cache all recent authentications based on the parameter(s) used for quicker processing during the next authentication. Device authentication can be advantageous in that the characteristics of the PD can be identified based upon a registered MAC address. For example, in an enterprise's desire to tightly control or test the behavior of a PoE network, the enterprise can restrict use of the PoE network to only those PDs that have been previously validated by the IT department. Devices that have not yet been validated would be restricted from use of the PoE network.

In another embodiment, the authentication process could be based on some form of user authentication. For example, the authentication process could be designed to verify a username/password. While authentication of an individual may not, in and of itself, authenticate a device, its use in the authentication process can prevent non-employees (or other unauthorized users) from receiving power from the network. For example, authentication of a username/password can determine whether an individual is authorized to install a new PD (e.g., touch screen kiosk) on the PoE network. More generally, the restriction placed on users of the network can be used to control access to a limited PSE power budget.

In yet another embodiment, a user that has been issued, or otherwise been given rights to or control of, a new piece of hardware can log onto an internal website and register the MAC address of the device under his/her user name. This enables a hybrid type of approach that effectively enables authentication of both the user and the hardware.

In the above description, examples have been provided of particular authentication schemes that can be used. These examples are not intended to limit the scope of the present invention. As would be appreciated, any authentication process that can identify the computing device, user of the computing device, or aspect of use of the computing device can be used in the authentication process of the present invention. It should also be noted that in one embodiment, the authentication information transmitted across the network or the PSE-PD data can be optionally encrypted.

Returning to the flowchart of FIG. 2, if it is determined, at step 208, that the PD is not authenticated, then the power on the port would be restricted at step 210. In one example, this restriction can be effected through an elimination of the provision of power on that port. In another example, this restriction can be effected by maintaining the power level on that port to a "safe" level through a power budget limitation such as a current limit on the port. In general, this restriction is aimed at minimizing the risk in applying power to an unknown device. An additional benefit of keeping the device on at a "safe" level or low power mode is that the discovery and classification process will not be retriggered, which is common in PSE devices due to the difficulty in detecting the device being unplugged when it is not being powered.

If, on the other hand, it is determined, at step 208, that the PD is authenticated, then the power on the port can be allowed or otherwise permitted to continue. In one example, the authentication can enable a change to a second power level that can represent the maximum power level that is available, requested, or otherwise desired. In general, authenticated devices would be enabled to receive power from the PSE at levels greater than devices that are not authenticated.

As has been described, an authentication mechanism has been included in a PoE system to limit powering of devices connected to the PoE system. As noted above, the principles of the present invention can be applied to various types of PDs, such as computing devices, security cameras, VoIP phones, wireless access points, etc.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A power over Ethernet system, comprising:
   a powered device detection component that detects a presence of a network device upon coupling of said network device to a power source equipment port via an Ethernet cable;
   a power controller that initiates a first delivery of power to said power source equipment port, said first delivery of power being restricted by a current limit that is assigned to said power source equipment port, said current limit being set to a first level during said first delivery of power; and
   an authentication component that receives authentication information from said
   computing device while said computing device receives said first delivery of power, said authentication component determining whether said received authentication information matches registered authentication data, wherein upon a determination that said received authentication information matches said registered authentication data, said power controller changes said current limit assigned to said power source equipment port to a second level that is higher than said first level, said current limit at said second level enabling a second delivery of power to said power source equipment port that is at a level higher than said first delivery of power, wherein said power controller ends a delivery of power to said power source equipment port if said authentication information does not match said registered authentication data.

2. The system of claim 1, wherein said network device is a portable computer.

3. The system of claim 1, wherein said authentication component authenticates a MAC address.

4. The system of claim 1, wherein said authentication component authenticates a username and password.

5. The system of claim 1, wherein said authentication component is in a power sourcing equipment.

6. The system of claim 1, wherein said authentication component is in an authentication server.

7. A power over Ethernet method, comprising:
   detecting a presence of a powered device that is coupled to a power source equipment port via a network cable;
   setting a current limit for said power source equipment port to a first level;
   delivering a first amount of power to said powered device in accordance with said current limit;
   receiving authentication information from said powered device while said powered device receives said first amount of delivered power;
   if said powered device is authenticated based on said received authentication information, then increasing said current limit to a second level higher than said first level; and
   if said powered device is not authenticated based on said received authentication information, then ending a delivery of power to said powered device.

8. The method of claim 7, wherein said powered device is a computing device.

9. The method of claim 7, wherein said powered device is one of a security camera, voice over IP phone, and wireless access point.

10. The method of claim 7, wherein said detecting comprises detecting via Layer 1 communication.

11. The method of claim 7, further comprising authenticating said powered device via Layer 2 or Layer 3 communication.

* * * * *